United States Patent
Lamb et al.

(10) Patent No.: US 8,424,023 B2
(45) Date of Patent: Apr. 16, 2013

(54) PROGRAM INTERFACE ARCHITECTURE

(75) Inventors: James A. Lamb, Elkhorn, NE (US);
Joseph G. Giebler, Omaha, NE (US);
Jeffrey M. Cameron, Omaha, NE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2240 days.

(21) Appl. No.: 10/692,939

(22) Filed: Oct. 24, 2003

(65) Prior Publication Data
US 2005/0091669 A1 Apr. 28, 2005

(51) Int. Cl.
*G06F 9/44* (2006.01)
*G06F 9/455* (2006.01)

(52) U.S. Cl.
USPC .............................................. 719/328; 703/23

(58) Field of Classification Search .. 379/221.1–221.12; 455/3.04, 439; 719/328–332, 319; 703/23–28
See application file for complete search history.

(56) References Cited

U.S. PATENT DOCUMENTS

| | | | |
|---|---|---|---|
| 5,574,915 A | 11/1996 | Lemon et al. | |
| 5,724,590 A | 3/1998 | Goettelmann et al. | |
| 5,767,849 A | 6/1998 | Borgendale et al. | |
| 5,889,954 A * | 3/1999 | Gessel et al. | 709/223 |
| 5,958,049 A | 9/1999 | Mealey et al. | |
| 6,014,511 A | 1/2000 | Krithivas et al. | |
| 6,063,128 A | 5/2000 | Bentley et al. | |
| 6,067,584 A | 5/2000 | Hayles et al. | |
| 6,086,623 A | 7/2000 | Broome et al. | |
| H0001921 H * | 11/2000 | Fletcher et al. | 455/433 |
| H1921 H * | 11/2000 | Fletcher et al. | 455/433 |
| 6,393,605 B1 | 5/2002 | Loomans | |
| 6,484,309 B2 * | 11/2002 | Nowlin et al. | 717/100 |
| 6,519,623 B1 | 2/2003 | Mancisidor | |
| 6,553,429 B1 * | 4/2003 | Wentz et al. | 719/330 |
| 6,651,123 B1 * | 11/2003 | Hutchison et al. | 710/200 |
| 6,725,451 B1 * | 4/2004 | Schuetz et al. | 717/151 |
| 6,986,148 B2 * | 1/2006 | Johnson et al. | 719/332 |
| 2001/0008023 A1 | 7/2001 | Bond et al. | |
| 2002/0052727 A1 * | 5/2002 | Bond et al. | 703/26 |
| 2002/0066085 A1 | 5/2002 | Nowlin JR. et al. | |
| 2002/0099532 A1 * | 7/2002 | Traut | 703/27 |
| 2003/0101334 A1 * | 5/2003 | Desoli | 712/227 |
| 2003/0217188 A1 * | 11/2003 | Kung et al. | 709/310 |

OTHER PUBLICATIONS

Fletcher "Generic Wireless Telecommunications system" US Statutory Invention Registration (Reg. No. H,1921) Nov. 2000 pp. 1-34.*

* cited by examiner

Primary Examiner — Charles E Anya

(57) ABSTRACT

A method, system, and device embodiments for interfacing a program are disclosed. A computing device can include an application layer, an operating system layer, and an interface module. The operating system layer can include a first type of operating system and associated application program interfaces (APIs). The interface module can be coupled between the application layer and the operating system layer. The interface module can receive program instructions from a program in the application layer written for a second type of operating system and can process the instructions by directing the instructions to APIs that correctly execute the instructions.

30 Claims, 3 Drawing Sheets

PROGRAM INTERFACE ARCHITECTURE

INTRODUCTION

A computing device, such as a server, router, and other devices having processor logic and memory, includes an operating system layer and an application layer to enable the device to perform various functions or roles. The operating system layer includes a master control program that runs the computing device. The master control program provides task management, device management, and data management, among others. The operating system layer contains an operating system that sets the standards for application programs that run on the computing device. The operating system layer has software programs that include a set of Application Program Interfaces (APIs). An API includes a language and/or message format used by an application program to communicate with the operating system. For example, the language and/or message format of the APIs allow an operating system to interpret executable instructions received from program applications in the application layer and return results to applications.

APIs are implemented by writing function calls in the program, which provide the linkage to the required subroutine for execution. There are more than a thousand API calls in a full-blown operating system such as Windows, Mac, or Unix.

In the field of software programming, programs are often created for use on a particular operating system. In other words, the program applications are generally created to provide instructions in a language and/or format recognizable by the APIs associated with a particular operating system. Thus, a program created for use with Microsoft Windows, will likely not be capable of running on another operating system such as Linux. In order for a Windows based program to be utilized on a Linux based system, the program would likely have to be substantially rewritten and would likely have to be written on a Linux based system. In this way, the adaptation of a program, based on one operating system, for use on another operating system in effect creates two distinct programs that do similar functions, but on two different operating systems. Writing programs to interface with the APIs of many different operating systems can be costly and can expend a significant amount of time.

In the telecommunications field, newer programs are continually being written to provide additional telecommunication application services. Many of these newer programs are written to function with the particular APIs that are associated with newer and more robust operating systems. That is, the programs may be written to execute on larger, faster, or more specialized computing devices having more advanced operating systems and different sets of APIs than that which exist on earlier generation telecommunications equipment hardware. As such, the program application as a whole may not be able to execute on the different or earlier operating system or all of the features and/or functions offered by these programs may not be able to execute on either different or earlier generation operating systems from that for which they were written. Thus, new or different services or capabilities of these applications are generally not available to the earlier generation equipment.

One alternative is to replace the earlier generation equipment and its associated operating system with a computing device that has an operating system which accommodates the new program types. However, this alternative is not always a viable economic alternative when replacing high-end computing equipment. Many commercial telecommunications backbone systems around the world have legacy hardware are not economical to replace. For example, in the telecommunications markets of Central and South America, much of the telecommunications equipment is older generation equipment that has been purchased after being retired in other markets. In these environments, upgrading the computing device hardware to accommodate a new software application may not be possible. Accordingly, new software applications will either not be useable with the hardware having an older operating system, or will have certain features and/or functions which do not execute correctly on the older operating system and thus cannot be used to their fullest capability. In order to provide some or all of the updated or different features and/or functions of a newer or different software program, the program will have to be rewritten to execute with the APIs on the operating systems of the existing hardware or to remove the features or functions if the operating system does not have an API to execute that feature or functionality. As noted above, this option is undesirable for the software manufacturer because the manufacturer has to expend a lot of effort to rewrite the software.

DETAILED DESCRIPTION

Embodiments of the present invention provide devices, systems, and methods that allow program applications (i.e., software in the application layer) written for a second type (i.e., a particular type) operating system to be utilized on a first type operating system (i.e., an entirely different operating system or an earlier or later generation operating system from that for which the program application was written). Various embodiments of the invention can be performed in one or more computing devices and/or systems of computing devices, such as telecommunications systems, among others.

In the present application, computing devices in the field of telecommunications are illustrated as an example of the issues faced with newer program applications and older generation legacy hardware. Embodiments of the invention, however, are not limited to this illustrative implementation.

By way of reference, telecommunication systems, among others, can include networks of computing equipment. The computing equipment includes computer devices that have operating system software thereon. Telecommunication programs are generally written to execute with a particular operating system software to enable the equipment to function in different roles with the system or network architecture. For example, various telecommunications computing equipment can include programs to enable a given computing device to function as a Home Location Register (HLR). An HLR includes a computing device having programs and a database for tracking subscribers within a cellular network provider's home service area. As another example, telecommunications computing equipment can include programs to enable a given computing device to function as a Mobile Switching Center (MSC) in a wireless telecommunication network. A MSC includes computing devices that connect landlines in the Public Switched Telephone Network (PSTN) to a wireless phone system. As yet another example, telecommunications computing equipment can include programs to enable a given computing device to function as an Intelligent Network Servers (INSs). Intelligent Network Servers (INSs) can serve as media platforms to provide additional telephone services such as toll-free 800 call routing and/or virtual private network call routing. Each of the HLR, MSC, and INS programs are written to execute with the particular operating system that is resident on the computing device on which the programs are to be run.

Figure 1:
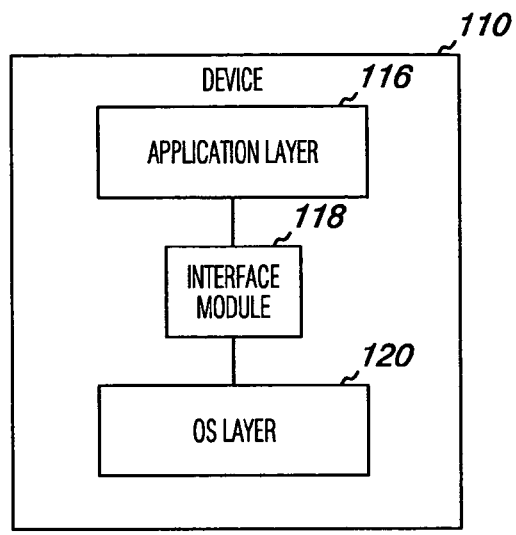
FIG. 1 is a block diagram illustrating a device embodiment.

FIG. 1 is a block diagram illustrating a computing device 110. The computing device 110 can be used as a piece of telecommunications equipment to function as a HLR, a MSC, or an INS, among others. FIG. 1 illustrates that the computing device 110 includes an application layer 116 that can include program applications having executable instructions to cause the computing device 110 to perform certain functions in order to serve in the computing device's 110 intended role, e.g., as a HLR, MSC, INS, or otherwise. The computing device further includes an operating system layer 120. As mentioned above, the operating system layer has software programs that include a set of Application Program Interfaces (APIs). The language and/or message format of the APIs allow an operating system to interpret executable instructions received from program applications in the application layer and return results to the application. When program instructions are not in the correct language or message format to communicate with the APIs in the operating system layer 120, errors in program execution can occur.

As shown in the embodiment of FIG. 1, the computing device can be provided with an interface module 118 coupled between the application layer 116 and the operating system layer 120. As will be explained in more detail below, the interface module 118 will enable a program application in the application layer 116 to properly execute with a first type of operating system in the operating system layer 120 which is different from a second type of operating system for which the program application was written. The designation of a first type and a second type, as used herein, identifies that there is a difference in the operating system present in the operating system layer 120 from the operating system for which the program application was designed to execute. In various embodiments, the difference can be that the two are entirely different operating systems (e.g., a Linux operating system versus a UNIX operating system) or the difference can be that the one operating system is a different version of the same type of operating system (e.g., the operating system on the computing device is an earlier or later generation UNIX operating system from a UNIX operating system for which the program application was written). Either of the first type and/or the second type of operating system can be a Linux, UNIX, and/or Windows operating system, among others. Embodiments, however, are not limited to these examples.

The interface module 118 can receive instructions from a program application in the application layer 116 and can process those instructions, as will be explained in more detail below, to return correct results even when the program application was not written for the particular APIs associated with the operating system software in the operating system layer 120.

The interface module 118 is useful in many situations. For example, as mentioned earlier, it is sometimes not economically feasible to replace certain equipment or hardware having a different or earlier generation operating system.

Older telecommunications computing devices are one example of implementation for the embodiments described herein. For instance, an older computing device intended to serve in the role of a HLR may have a certain version of UNIX operating system software with associated APIs running in its operating system layer 120. The HLR device will typically contain program applications in its application layer 116 which are written for that certain version of UNIX operating system software and its associated APIs. These APIs will have a language and message format used by the program applications to communicate with the operating system or some other control program such as a database management system (DBMS) or communications protocol.

The program applications have executable instructions to cause the computing device to perform in its intended role. For programs run on the particular operating system for which they were written, the program applications have access to appropriate APIs in the operating system software to correctly execute the program application's instructions. This allows the computing device to function in its intended role, e.g., in the case of a HLR to maintain a database of subscribers for a cellular telephone network provider within the provider's home service area.

According to various embodiments, the interface module 118 can allow program applications which were not written for the above example version of UNIX operating system software to execute correctly on the computing device 110. As will be explained in more detail below, the interface module 118 achieves this ability by providing access to appropriate APIs not found in the UNIX operating system layer 120. As such, the computing device 110 having a different type of operating system from that for which the program application was written can correctly execute those program application instructions as well. Accordingly, different program applications can be provided in the application layer 116 which were written for a different version of UNIX operating system software, or written for a different type of operating system software, e.g., Linux operating system software, and by use of the interface module 118 can be correctly executed on the computing device 110. The interface module 118 can process the executable instructions from such program applications to enable those instructions to correctly execute on the different operating system. Examples of processing include the interpretation, translation, and conversion operations of the interface module 118 and are described in more detail below.

For example, the interface module 118 can process instructions from a program application, by interpreting which instructions can proceed to original APIs in the operating system from those that will have to be processed further, as will be explained below. This can be accomplished by using a list, table, matrix, or other organizational structure that can have the instructions to be processed listed therein. The instructions in the list can be linked to directions regarding what to do with the instructions. The instructions sent from the program application can then be compared to those listed. For instance, if the instruction sent from the program application does not match an instruction on the list, the instruction can be passed to the operating system layer. However, if the instruction sent from the program application matches an instruction in the list, then the directions can be used to process the instruction. Instructions can then be processed in a variety of ways, for example, by translating the instruction to receive a correct result from an original API, by converting the result from an original API, or by directing the instruction to a modified or new API, among others.

The list or look up table in the interface module 118 can include code or filename structures associated with the first type of operating system on the computing device. In this manner, when a received program application instruction does not match the code or filename structures in the list the interface module 118 will interpret that the instruction has to be translated or that a substitute API (e.g. new or modified) is to be used. When the received program application instruction does match the code or filename structures in the list the interface module 118 can pass the program application instruction to the first type of operating system. Alternatively, the emulation module can include code or filename structures associated with the second type of operating system for which the API related errors have been identified when running the program application on the first type of operating system. In this manner, when a received program application instruction matches a code or filename structure in the list, the interface module 118 will interpret the instructions as needing a substitute API and direct the program application instruction to a substitute API. Conversely, when a received program application instruction does not match any of the code or filename structures in the list, the interface module 118 can send the program application instruction directly to the first type of operating system.

As stated above, the interface module 118 can translate instructions from a program application within the application layer 116. For example, in some instances, a first operating system would be able to provide a correct result to a program application from a second operating system but the instruction used by the program application is not correctly formatted to ask for the information. For instance, a program application instruction is designed to request the time from an operating system by using the instruction READCLOCK and expects the format of the result to be, for example, 1:00 P.M. Jul. 19, 2003. However, the operating system resident on the computing device does not understand the instruction READCLOCK, but if asked for GETTIME, would return the data in the correct format (i.e., 1:00 P.M. Jul. 19, 2003). In this case, the interface module can translate the instruction from the program application by substituting the READCLOCK instruction with a GETTIME instruction. In this way, the instruction can be changed and the original API in the first operating system can be used.

Another way in which the interface module 118 can process instructions is by converting the information received from an API. This type of processing is useful when, for example, a first operating system would not be able to provide a correct result to a program application from a second operating system, but the result from the operating system could be converted to provide the correct result. For instance, using a similar example to the one shown above, a program application requests the time by using the instruction READCLOCK and expects the format of the result to be 1:00 P.M. Jul. 19, 2003. However, in this case, the operating system understands the instruction READCLOCK, but when asked returns an incorrect result, such as 1300 Jul. 19, 2003. In this case, the interface module can convert the result from the program application by changing the format of the result to the correct format (i.e., 1:00 P.M. Jul. 19, 2003). To accomplish the conversion of the information, a software algorithm can be designed to take the military time (i.e., 1300) and change it to standard clock time (i.e., 1:00 P.M.). In this way, the result can be changed and the original API in the first operating system can be used.

In some situations, the operating system may not be able to provide a result that can be used by the program application. For example, using a similar example to those shown above, the first operating system does not have the functionality to return a time, or the time result that can be returned cannot be converted. In these situations, a new API can be provided that will enable the operating system to provide a correct result. In cases where the result from the original API in the first operating system cannot be converted, the interface module 118 can direct the instruction, as described above, to the new API.

In brief, APIs that enable a program application to run and function correctly, but which are not present or exist in another form on the operating system layer 120, e.g., first type of operating system, of the computing device 110 are identified. Once identified, an existing API on the first type operating system, e.g., on the operating system layer 120, can be copied and modified or new APIs associated with the second type of operating system for which a given program application was written, can be added to the interface module 118 to make the needed APIs available to the program application. In this manner, new APIs are provided without affecting the original APIs within the first type operating system. The original APIs can be left in place in the first type of operating system in the operating system layer 120. As explained in more detail below, the interface module 118 can direct program instructions to bypass the original APIs when the original APIs are inappropriate for the particular program application. An advantage of leaving the APIs in the first type of operating system is that the first type of operating system can continue to service program applications which are written for that particular type of operating system.

By providing the new and modified APIs in the interface module 118 the operating system on the computing device (e.g., the first type of operating system different from the second type of operating system for which the program application was written) does not have to be changed. By using the interface module 118 according to embodiments described herein, APIs can be modified, deleted, and/or added without affecting the first type of operating system.

By way of example and not by way of limitation, HLR, MSC and/or INS program applications, among others, can be run on computing devices having operating system software which is different from that for which a given HLR, MSC and/or INS program application was written. In this way, program applications including newer telecommunications program applications which were written for newer and more robust operating systems can be utilized on a different type of operating system without having to rewrite the entire program. The newer or different telecommunication program applications written to function on newer, different, and/or more robust operating systems include program applications written to execute on larger, faster, or more specialized computing devices having more advanced operating systems than that which exist on earlier generation or different telecommunications equipment hardware.

Figure 2:
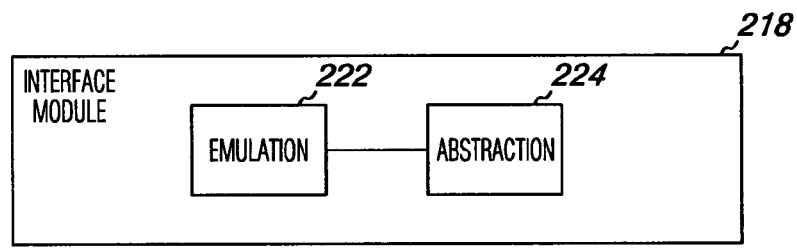
FIG. 2 is a block diagram illustrating a detailed view of an embodiment of an interface module.

FIG. 2 is a block diagram illustrating another embodiment of an interface module 218. The interface module 218 can serve as the interface module shown as 118 in FIG. 1.

As shown in the embodiment of FIG. 2, the interface module 218 can be divided into discrete sections. In this embodiment, the interface module 218 is divided into an emulation module 222 and an abstraction module 224. The emulation module 222 can contain a list or look up table of certain program application instructions that are to be processed. The emulation module 222 can also include instructions for routing those certain program application instructions to APIs from those which are found in the operating system layer, e.g., 120 in FIG. 1.

The different APIs can be provided in the abstraction module 224. In this way, the APIs in the operating system layer, e.g., 120 in FIG. 1, can be left intact and those program application instructions which will use different APIs can be routed by the emulation module 222 to the different APIs in the abstraction module 224. This embodiment also allows program application instructions for other program applications, which can function with the APIs in the operating system layer, e.g., 120 in FIG. 1, to have access to the same.

In the embodiment of FIG. 2, the emulation module 222 can use software and/or firmware to receive program application instructions, compare those to a list or look up table, and recognize when a program application instruction, e.g., from a program application in the application layer 116 in FIG. 1, will have to be processed or should use an API different from an original API in the operating system software, e.g., in the operating system layer 120 of FIG. 1. The emulation module 222 also includes software and/or firmware to provide directions for routing the received program application instructions to its appropriate API, whether in the operating system software in the operating system layer, e.g., 120 in FIG. 1, or when provided as a new or modified API in the abstraction module 224.

The emulation module 222 can provide processing functions such as interpreting and translating program application instructions and converting results, as discussed above with respect to FIG. 1. In various embodiments, the emulation module 222 can route program application instructions to APIs in the abstraction module 224 which can process the instructions. Thus, those APIs can correctly execute the instructions as would the API in an operating system for which an application program was written.

To populate the abstraction module 224 and provide the look up table or list to the emulation module 222, an application program written for a second type of operating system can be run on the first type of operating system (e.g., an operating system resident in the operating system layer 120 of FIG. 1 for a computing device 110 on which the application program is desired for use) in order to preemptively identify where errors may occur in the execution of the application program instructions. A program analysis can be conducted on the errors which occur in this exercise to identify which errors are attributable to accessing incorrect APIs. As known by one of ordinary skill in the art, API related errors can be identified by manual review of the data and operation results when the program application is run on an operating system for which it was not designed. That is, the returned data and/or operations performed can be compared to known correct data and operation results received when the program application is run on the second type of operating system for which it was written. Software can also be used to monitor the execution of program application's instructions and track which instructions either returned no results (e.g., triggered an error) or returned results that were incorrect, creating data errors and computing device malfunctions elsewhere.

Once identified, a list of the program application instructions, written for the second type of operating system, which have API related errors when run on the first type of operating system can be compiled and stored in an organizational structure such as a look up table or list in the emulation module 222. Likewise, substitute APIs for those program application instructions which have API related errors when run on the first type of operating system can be stored to particular locations in the abstraction module 224. The abstraction module 224 can include software, firmware, and/or combinations thereof to access particular memory locations in the abstraction module 224. One of ordinary skill in the art will appreciate the manner in which substitute APIs can be provided. For example, APIs existing in the second type of operating system for which the program application was written can be copied and stored to particular memory locations in the abstraction module 224. Likewise, APIs existing in the first type of operating system on the computing device, e.g., in the operating system layer 120 of FIG. 1, can be copied, modified, and stored to particular memory locations in the abstraction module 224. Modifications can include writing additional computer code to change the language and/or format of the API or its result such that the API performs differently. Embodiments, however, are not dependent on the manner in which the APIs are modified or the manner in which a substitute API is stored to a memory location in the abstraction module 224.

For example, in some embodiments, modification of an API can be accomplished by adding an if-then style statement to the programming of the API. The if-then statement could provide that, if the instruction from the application asked for a time stamp in a format different from that which the operating system will provide, then convert the time stamp obtained from the operating system to the correct format before returning the result to the program application. However, the invention is not limited to the addition of if-then statements, and various methods can be used to change the programming of an API to make a modification.

Embodiments of the present invention include providing a list or look up table in an emulation module 222 for those program application instructions for which API related errors have been identified when running the program application written for a second type of operating of the computing device. Once identified, embodiments also include making substitute APIs available to the computing device, whether the computing device is to be used as a HLR, MSC, INS, or otherwise. Whether the substitute APIs are copied from the second type of operating system for which a particular application was written, from the first type of operating system, and then modified, or are new APIs, they are stored to particular memory locations in the abstraction module 224. The emulation module 222 is then provided with routing directions such that when the program application instructions of the program written for the second type of operating system, and which have API related errors when run on the first type of operating system, are received by the emulation module 222 the emulation module 222 can route these particular program application instructions to the substitute APIs in the abstraction module 224. In other words, as program application instructions are received by the emulation module 222, software and/or firmware on the module 222 can compare the received instructions against a list or look up table to ascertain whether the program application instructions have been provided with a substitute API in the abstraction module 224. Embodiments of the invention are not limited to a particular software program for performing the look up and compare functions and one of ordinary skill in the art will understand the manner in which such functions can be performed. However, once identified from the list or look up table that a substitute API is present, the emulation module 222 will direct these program application instructions to the correct location of the substitute API in the abstraction module 224.

As described with respect to the interface module 118 of FIG. 1, the interface module 218 of FIG. 2, can process instructions such as by interpreting, translating, and/or converting a program application instruction. An example of using the interface module 218 of FIG. 2 to interpret an instruction is provided as follows. When a program application instruction, coming from an application layer, e.g., application layer 116 in FIG. 1, is received by the emulation module 222, the emulation module 222 compares the instruction to its list or look up table and may find that this instruction is one for which there is not an appropriate API in the operating system layer, e.g., operating system layer 120 in FIG. 1. As such, the emulation module 222 interprets this program application instruction as needing a substitute API. Accordingly, the emulation module 222 uses the list or look up table to find appropriate routing directions for this program application instruction to a substitute API in the abstraction module 224 which can process the instruction.

Thus, embodiments of the present invention include an interface module 218 which can be added between the data path of an application layer, e.g., application layer 116 in FIG. 1, and an operating system layer, e.g., operating system layer 120 in FIG. 1. According to embodiments, an interface module 218 which includes an emulation module 222 and an abstraction module 224, as described above, is added to earlier generation computing device equipment which has different type of operating system for which certain types of program applications were not written. By doing so, these certain types of program applications can then execute correctly on the earlier generation computing device equipment.

Figure 3:
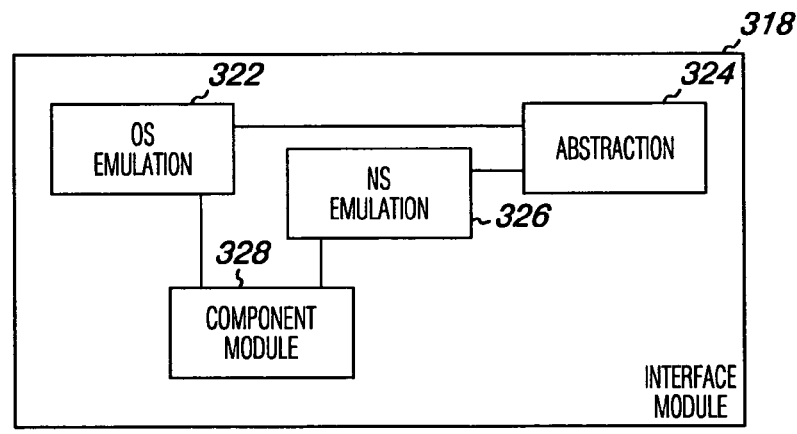
FIG. 3 is a block diagram illustrating a detailed view of another embodiment of an interface module.

FIG. 3 is a block diagram illustrating another embodiment of an interface module. The interface module 318 can be used in place of the interface module 118 in a device such as that shown in FIG. 1.

The interface module 318 embodiment of FIG. 3 is divided in additional ways. For example, the functions of the interface module 318 can be divided into independent subject matter modules, such as an operating system emulation module 322 to handle API language and format associated with operating system functions of a computing device and a network server emulation module 326 to handle API language and format associated with network server functions for the computing device. However, the invention is not so limited (e.g., one module may perform the function of several of modules or one module may be included in another module, etc.). As with the embodiment of FIG. 2, the embodiment of FIG. 3 provides a division of functions into distinct modules that allows for modules to be added, edited, or removed without affecting the other modules therein. In FIG. 3, the interface module 318 is divided into several modules including an operating system emulation module 322, an abstraction module 324, a network server emulation module 326, and a component module 328.

In the embodiment shown in FIG. 3, the network server emulation module 326 can direct instructions regarding network functionality to APIs for executing network functions. The APIs can be in the operating system layer, in the abstraction module 324, or the abstraction module 324 can be divided into separate modules for network server functions and operating system functions, among others.

For example, in a telecommunications network, network servers such as HLRs keep track of the users of the network. This is typically done by identifying a user with an identification number. Some types of identification numbers include Mobile Identification Numbers (MINs), Electronic Serial Numbers (ESNs), and International Mobile Equipment Identifiers (IMEIs). In some cases, the network server application that is designed for a second type of operating system tracks identification numbers using a database set up by using APIs of the second type operating system to instruct the operating system to correctly format new data into the database. When the application is run on a device having a first type of operating system, the APIs for setting up the identification number database can be different and, therefore, information can be lost, positioned incorrectly, or the updates cannot be performed.

In these cases, the existing APIs for database management in the first type operating system can be modified or new APIs provided that can format and/or place the incoming data in the correct location within the database. These modified and/or new APIs can be provided within the interface module 318, such as within the abstraction module 324. The directions to the modified and/or new APIs can be provided in the network server emulation module 326. In this way, the network server functions can be addressed by a network server emulation module, e.g. NS module 326 of FIG. 3, while other functionality such as the operating system functions can be addressed by one or more other modules such as the operating system emulation module 322.

Additionally, component modules 328 can be provided where a component can be designed or provided by a first party that can be inserted to provide a particular feature. This embodiment also illustrates that the device can be adapted to utilize packaged software modules that provide a necessary function without having to rewrite the entire code into the device. For example, if a time stamping module has been designed, the module can be inserted as a component module 328 and the operating system emulation module 322 can direct requests for time stamping to the component module 328.

In various embodiments, the interface module 318 can be used to interpret, translate, and/or convert an instruction or result from either the application layer or the operating system layer. Additionally, the various modules of the interface module 318, such as modules 322, 324, 326, and 328 can transfer information to and from each other in order to execute the instructions from an application program and provide the correct result.

Embodiments can be performed by software, application modules, and computer executable instructions operable on the systems and devices shown herein or otherwise. The embodiments of the invention, however, are not limited to any particular operating environment or to software written in a particular programming language. Software, application modules and/or computer executable instructions, suitable for carrying out embodiments of the present invention, can be resident in one or more devices or locations or in several and even many locations.

Figure 4:
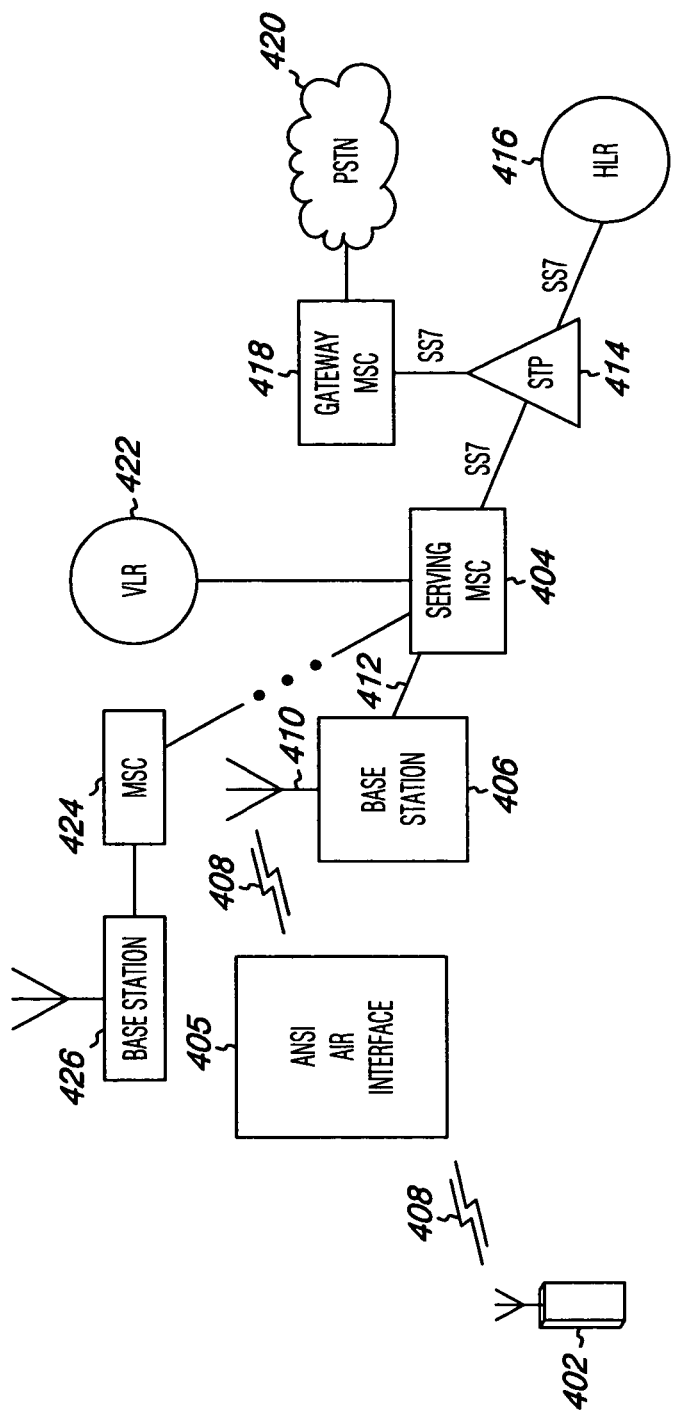
FIG. 4 is a block diagram of a network embodiment.

FIG. 4 is a block diagram of a mobile network embodiment illustrating a mobile device 402 communicating with a mobile switching center (MSC) 404. One type of mobile network includes an IS-41/CDMA network as the same are known and understood by one of ordinary skill in the art. The embodiment of FIG. 4 is provided for reference as to the type of computing device environments which can benefit from embodiments of the present invention.

In a typical wireless telecommunications system, the MSC is connected to a plurality of base stations that are dispersed throughout the geographic area serviced by the system. The geographic area serviced by a wireless telecommunications system is partitioned into a number of spatially distinct areas called "cells." Each MSC is responsible for, among other things, establishing and maintaining calls between mobile devices and between a mobile device and a wireline terminal, which is connected to the system via the local and/or long-distance networks. An MSC is a telephone switch specialized for wireless and mobility support. An MSC performs various functions, including mobility management, call handoffs, call admission, call control, resource allocation, and so forth. The call is then relayed from the MSC to base stations and via wireless communications to the mobile device.

In FIG. 4, whenever the mobile device 402 activates or roams into a new MSC coverage area (i.e., the "cell" for which the MSC is responsible) the new MSC becomes the serving MSC. The mobile device transmits its stored identity to the new serving MSC via a base station 406. As shown in FIG. 4, the subscriber identity information is transmitted over a radio channel 408 in a format compliant with an air interface 405 (e.g. ANSI/IS-41) and detected by an antenna 410 of base station 406. Base station 406, in turn, transmits the subscriber identity information to the serving MSC 404, such as for example, via communication line 412.

In order to provide mobile service to the newly registered mobile device 402, the serving MSC 404 transmits a Mobile Application Part (MAP) based signal, such as a registration notification signal (IS-41 message) or location update signal (GSM message), to a home location register (HLR) 416 via a signaling link such as a signal transfer point (STP) 414. A STP is a node in the signaling system 7 (SS7) telephone network that routes messages between exchanges, and between exchanges and databases that hold subscriber and routing information. A HLR is one such database in a cellular system that contains all the subscribers within the provider's home service area. The data in the HLR is requested and transferred via SS7 to a VLR in the new area.

In the embodiment of FIG. 4, the STP 414 routes the MAP based signal to a gateway MSC 418. As shown in FIG. 4, the gateway MSC 418 can serve as a network switch for connecting to a public switched telephone network (PSTN) 420. SS7 is the protocol used in the PSTN for setting up calls and providing services. The SS7 network sets up and tears down the call, handles all the routing decisions and supports all modern telephony services, such as local number portability (LNP). LNP allows a telephone subscriber to port his/her phone number when that subscriber relocates to a different region of the country, even when the local area code may be different. The voice switches known as service switching points (SSPs) query service control point (SCP) databases using packet switches known as signal transfer points (STPs).

The MAP based signal informs the HLR 416 of the network address associated with the MSC 404 currently serving the mobile device 402 and also request requisite subscriber information for providing mobile service to the roaming mobile device 402. The HLR 416 updates its database to store the network address representing the serving MSC 404 and also copies the requested subscriber information to the VLR 422 associated with the serving MSC 404. The network address representing the serving MSC 404 stored in the HLR 416 is later utilized by the mobile network to reroute any incoming call intended for the mobile device 402 to the serving MSC 404.

Accordingly, whenever a telecommunications subscriber dials a telephone number for the mobile device 402, the HLR 416 is queried by the mobile network to determine the current location of the mobile device 402. Utilizing the stored network address in the HLR 416 representing the serving MSC 404, the HLR 416 requests a roaming number from the serving MSC 404 in response to the receipt of the query signal. The roaming number provided by the serving MSC 404 is then used by the telecommunications network to route the incoming signal towards the serving MSC 404. The serving MSC 404 then pages the mobile device 402 and accordingly establishes a voice connection with the mobile device 402, if available.

If the mobile device 402 roams out of serving MSC 404 coverage area and into another MSC 424 coverage area, MSC 404 will hand-off the communication to MSC 424 and base station 426. In this embodiment of a telecommunications network, the MSCs, HLRs, VLRs, and other computer device within the network can use an interface module, such as those described in detail with respect to FIGS. 1-3, to enable the devices to run program applications from different or other versions of operating systems. In this way, the network can use different software that can improve the performance of the network without changing the network's hardware.

As one will appreciate from having studied the above described embodiments, MSCs, HLRs, and/or VLRs, etc., are all computing devices which can be supplemented with an interface module. When an interface module, according to embodiments described herein, is coupled between the application layer and the operating system layer, program applications written for a second type of operating system will be able to run on and execute correctly with a first type operating system on the computing device even though it is different from the operating system for which the program was written.

Figure 5:
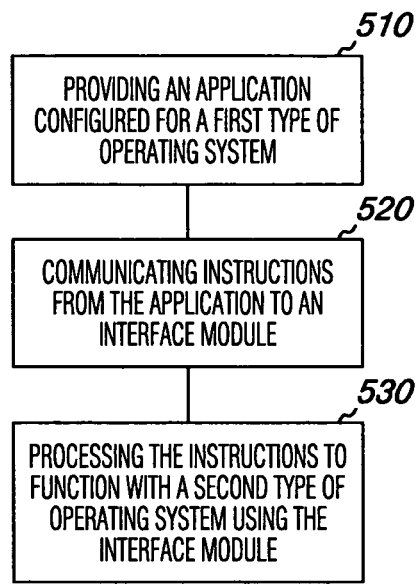
FIG. 5 is a block diagram of a method embodiment for executing an application on an alternate platform.
Figure 6:
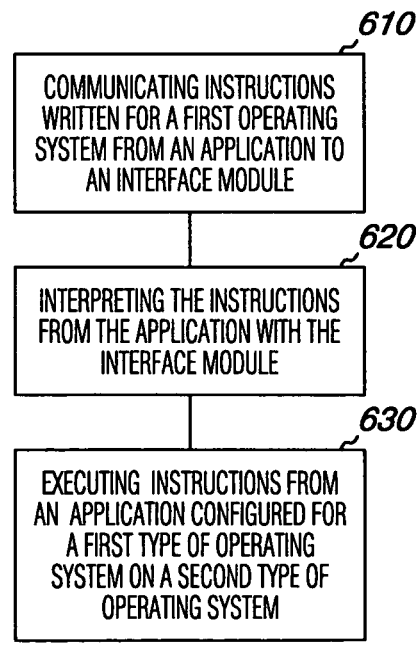
FIG. 6 is a block diagram of another method embodiment for executing an application on an alternate platform.

FIGS. 5-6 illustrate method embodiments for executing an application on an alternate platform. Unless explicitly stated, the method embodiments described herein are not constrained to a particular order or sequence. Additionally, some of the described method embodiments and elements thereof can occur or be performed at the same point in time. Additionally, one of ordinary skill in the art will appreciate that one or more of the various components within the embodiments of the invention can include computer readable media, on which a set of computer executable instructions can reside. Forms of computer readable media include Flash memory, RAM, ROM, and DDRAM, among others.

FIG. 5 is a block diagram of a method embodiment for executing an application on an alternate platform. In FIG. 5, the method includes providing an operating system that is a first type, an application configured for a second type of operating system, and an interface module at block 510. In various embodiments, an application configured for a second type of operating system can include a non-stop kernel type operating system. Operating systems of second and/or first types can include a Linux, Windows, or UNIX based operating systems, among others.

The method of FIG. 5 also includes communicating instructions from an application to the interface module at block 520. The embodiment also includes processing, such as by interpreting, translating, or converting, the instructions to function with a first type of operating system at block 530. Processing the instructions can include using a list of instructions to be processed.

FIG. 6 is a block diagram of another method embodiment for executing an application on an alternate platform. In the embodiment of FIG. 6, the method includes communicating instructions from an application to an interface module, the application configured for a first type of operating system at block 610. In various embodiments, communicating instructions from an application to an interface module can include communicating to an operating system emulation module, a network server emulation module, an abstraction module, or a component module within the interface module.

The method illustrated in FIG. 6 also includes processing the instructions, such as by interpreting, translating, or converting the instructions, from the application with the interface module at block 620. Interpreting the instructions can include directing an instruction from the operating system emulation module to an application program interface. The method of FIG. 6 also includes communicating the instructions from the interface module to a second type operating system at block 630. The method can also include identifying instructions to be translated and/or converted.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one.

Combination of the above embodiments, and other embodiments not specifically described herein will be apparent to those of skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device, comprising:
   a processor; and
   memory having instructions stored therein, that are executable by the processor, to provide:
   an application layer having executable instructions to provide one or more applications;
   an operating system layer having executable instructions to provide a first type of operating system and associated application program interfaces (APIs), wherein the associated APIs include a first number of APIs for operating on the first type of operating system that is resident on the computing device; and
   an interface module coupled between the application layer and the operating system layer, wherein the interface module includes a second number of APIs for operating with a second type of operating system that is not the type of operating system resident on the computing device and wherein the interface module receives program instructions from a program in the application layer written for the second type of operating system and processes the instructions to select either, one of the first number of APIs or one of the second number of APIs.

2. The computing device of claim 1, wherein the interface module includes an operating system emulation module for emulating a number of operating system functions.

3. The computing device of claim 1, wherein the interface module emulates operating system functions and network server functions.

4. The computing device of claim 1, wherein the interface module emulates home location register functions.

5. The computing device of claim 1, wherein the interface module emulates intelligent network server functions.

6. The computing device of claim 1, wherein the interface module has portions for emulating the operating system functions and the network server functions in discrete modules located within the interface module.

7. The computing device of claim 1, wherein the interface module processes a program instruction by interpreting whether the instruction has to be processed further.

8. The computing device of claim 7, wherein the interface module converts a result received from the operating system layer such that the converted result is in a format that the application program can use to execute the instruction.

9. The computing device of claim 7, wherein the application interface module translates the instruction received such that the operating system layer can execute the instruction.

10. A system architecture, comprising:
    a computing device including;
    a processor; and
    memory having instructions stored therein, that are executable by the processor, to provide:
    an application layer having a home location register application thereon and having executable instructions to provide one or more applications;
    an operating system layer having executable instructions to provide a first type of operating system and associated application program interfaces (APIs), wherein the associated APIs include a first number of APIs for operating on the first type of operating system that is resident on the computing device; and
    an interface module coupled between the application layer and the operating system layer, wherein the interface module includes a second number of APIs for operating the home location register application with a second type of operating system that is not the type of operating system resident on the computing device and wherein the interface module receives program instructions from the home location register application in the application layer written for the second type of and processes the instructions to select either one of the first number of APIs or one of the second number of APIs; and
    a connection for connecting the computing device to a publicly switched telephone network (PSTN).

11. The system architecture of claim 10, wherein the interface module has a number of modules to translate instructions between the operating system layer and the application layer.

12. The system architecture of claim 10, wherein interface layer includes an operating system emulation module that includes translation and interpretation information therein.

13. The system architecture of claim 10, wherein the system architecture further includes an operating system emulation module to direct an instruction from the home location register application to an application program interface.

14. The system architecture of claim 10, wherein the system architecture further includes a number of component modules that can interface between an application designed for a second type of operating system and the operating system layer having a first type of operating system.

15. A method of executing an application comprising:
    providing an application via an application layer having executable instructions to provide one or more applications to an operating system layer having executable instructions to provide a first type of operating system and associated application program interfaces (APIs), wherein the associated APIs include a first number of APIs for operating on the first type of operating system that is resident on the computing device;
    communicating instructions stored in memory and executable on a processor from the application to an interface module, wherein the interface module includes:
    a second number of APIs for operating the home location register application with a second type of operating system resident on the computing device and wherein the interface module receives program instructions from the application in the application layer written for the second type of operating system and processes the instructions to select either, one of the first number of APIs or one of the second number of APIs.

16. The method of claim 15, wherein processing the instructions from the application with the interface module includes using a list of instructions to be processed.

17. The method of claim 15, wherein the application is configured for a Linux based operating system.

18. The method of claim 15, wherein the application is configured for a Windows based operating system.

19. The method of claim 15, wherein the application is configured for a UNIX based operating system.

20. The method of claim 15, wherein the method further includes identifying instructions to be translated by the interface module.

21. A method of executing an application configured for a platform having first type of operating system on a platform having a second type of operating system comprising:

communicating instructions from the application to an interface module, the application configured for a first type of operating system;

interpreting the instructions from the application with the interface module by receiving program instructions from the application and processing the instructions to select either, one of a first number of APIs that are designed for use of the application on the first type of operating system and wherein the first number of APIs are resident on an operating system layer or one of a second number of APIs that are designed for use of the application on the second type of operating system and wherein the second number of APIs are resident on the interface module; and communicating the instructions from the interface module to an operating system that is the second type of operating system.

22. The method of claim 21, wherein communicating instructions from the application to an interface module includes communicating instructions to an operating system emulation module within the interface module.

23. The method of claim 22, wherein interpreting the instructions includes directing an instruction from the operating system emulation module to an application program interface.

24. The method of claim 21, wherein communicating instructions from the application to an interface module includes communicating instructions to a network server emulation module within the interface module.

25. The method of claim 21, wherein interpreting the instructions includes translating an instruction configured for the first type of operating system to an instruction configured for the second type of operating system.

26. The method of claim 21, wherein interpreting the instructions includes converting a result configured for the second type of operating system to a result configured for the first type of operating system.

27. A non-transitory computer readable medium having a set of computer executable instructions thereon for causing a device to perform a method, comprising:

communicating instructions from a telecommunications application to an interface module, the telecommunication application configured for a first type of operating system;

processing the instructions from the telecommunication application with the interface module by receiving program instructions from the application and processing the instructions to select either, one of a first number of APIs that are designed for use of application on the first type of operating system and wherein the first number of APIs are resident on an operating system layer or one of a second number of APIs that are designed for use of the application on a second type of operating system and wherein the second number of APIs are resident on the interface modal; and communicating the instructions from the interface module to an operating system that is a second type of operating system.

28. The non-transitory computer readable medium of claim 27, wherein communicating instructions from an application to an interface module includes communicating to an abstraction module within the interface module.

29. The non-transitory computer readable medium of claim 27, wherein communicating instructions from an application to an interface module includes communicating instructions to a component module within the interface module.

30. The non-transitory computer readable medium of claim 27, wherein the method further includes identifying instructions to be converted by the interface module.

* * * * *

UNITED STATES PATENT AND TRADEMARK OFFICE
CERTIFICATE OF CORRECTION

PATENT NO. : 8,424,023 B2  
APPLICATION NO. : 10/692939  
DATED : April 16, 2013  
INVENTOR(S) : James A. Lamb et al.

Page 1 of 1

It is certified that error appears in the above-identified patent and that said Letters Patent is hereby corrected as shown below:

In the Claims

In column 14, line 5, in Claim 10, delete "including;" and insert -- including: --, therefor.

In column 14, line 27, in Claim 10, delete "of" and insert -- of operating system --, therefor.

In column 14, line 61, in Claim 15, delete "system" and
insert -- system that is not the type of operating system --, therefor.

In column 16, line 22, in Claim 27, after "of" insert -- the --.

In column 16, line 27, in Claim 27, delete "modal;" insert -- module; --, therefor.

Signed and Sealed this
Twentieth Day of August, 2013

Teresa Stanek Rea
*Acting Director of the United States Patent and Trademark Office*